No. 771,484. PATENTED OCT. 4, 1904.
McCLELLAND MYERS.
MECHANICAL MOVEMENT.
APPLICATION FILED FEB. 3, 1904.
NO MODEL.
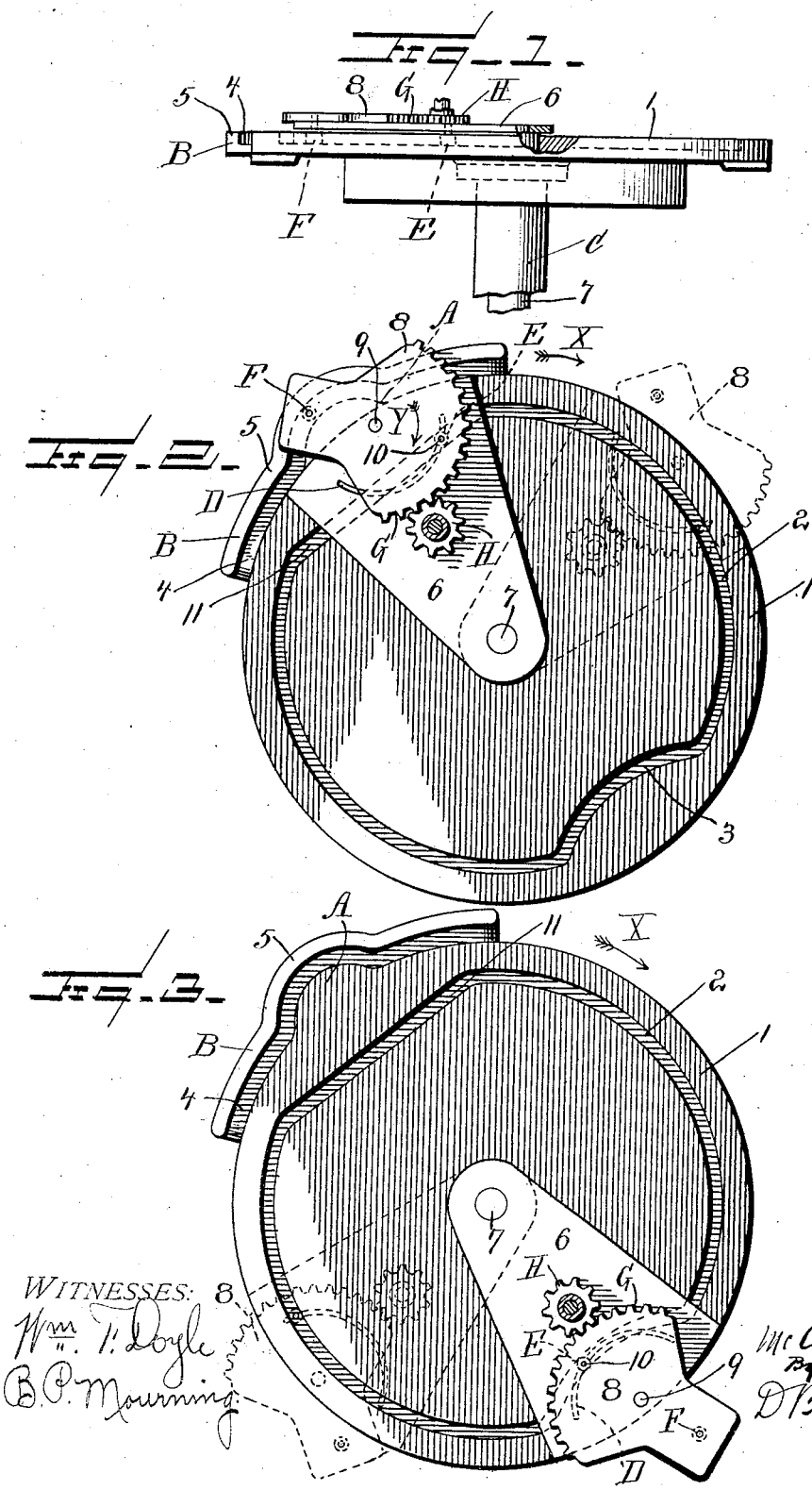
WITNESSES:
Wm. T. Doyle
B. P. Mourning
INVENTOR
McClelland Myers
By D. B. Replogle
Attorney No. 771,484.

Patented October 4, 1904.

UNITED STATES PATENT OFFICE.

McCLELLAND MYERS, OF MOOSIC, PENNSYLVANIA, ASSIGNOR OF ONE-HALF TO JOHN P. ELKINS, OF INDIANA, PENNSYLVANIA.

MECHANICAL MOVEMENT.

SPECIFICATION forming part of Letters Patent No. 771,484, dated October 4, 1904.

Application filed February 3, 1904. Serial No. 191,821. (No model.)

*To all whom it may concern:*

Be it known that I, McCLELLAND MYERS, a citizen of the United States, residing at Moosic, in the county of Lackawanna and State of Pennsylvania, have invented certain new and useful Improvements in Mechanical Movements, of which the following is a specification.

This invention relates to mechanical movements, and particularly to that class thereunder known as "gearing, alternating rotary."

The primary object of this invention is to provide a novel movement designed particularly for use in connection with glass-molding machinery for the purpose of threading an article made of glass during the process of manufacturing the said article, though the said movement may be used in other connections, and I do not wish to be limited in this respect.

A further object of the invention is to provide novel means for alternately rotating or partially rotating a plate having a toothed segment on its edge and in the provision of means for carrying the plate in such relation to other elements of the combination as to positively oscillate the said plate, preferably on a horizontal plane.

Furthermore, an object of the invention is to provide a plate of the character noted and in combination therewith a pinion taking motion from the teeth of the segment, the said pinion being utilized to rotate a sheath of a glass-mold or other device to which this invention may be conveniently applied.

Finally, an object of the invention is to provide a mechanical movement which will require comparatively little power, since the wearing parts are provided with antifriction-rollers, and which will prove efficient and satisfactory in use.

With the foregoing and other objects in view the invention consists in the details of construction and in the arrangement of parts to be hereinafter more fully set forth and claimed.

In describing the invention in detail reference will be had to the accompanying drawings, forming part of this specification, wherein like characters denote corresponding parts in the several views, and in which—

Figure 1 is a view in elevation, partly in section, showing a table and the parts of the mechanical movement embodying the invention. Figs. 2 and 3 are top plan views showing the parts in various positions which they assume in the course of operation.

In the drawings, 1 denotes a table or bed-plate having a camming-groove 2, which is curved inwardly, as at 3, and has a straight portion 11 diametrically opposite that portion which is inwardly curved. The table or bed-plate has a peripheral lug A, having a curved edge to form a cam. The bed-plate or table has an extension B, provided with a groove 4, the outer edge of which is bounded by a flange 5, having its inner surface or edge parallel with the edge of the bed or table and the lug A thereof. As the terms "bed" or "table" are alternate, the said element will be hereinafter referred to as a "table," it being understood that any platform or other support with a plain upper surface may be employed in this connection. The table is suitably supported by the leg C, and centrally thereof is journaled a shaft 7, which has its end connected to a sector 6, and as said shaft is rotated from any suitable source of power (not shown) the said sector is carried around and over the surface of the table. The outer end of the sector carries a plate 8, which is pivoted thereon by the stud or pin 9 in a manner to allow the free oscillation of the said plate with relation to the sector. A stud 10 is secured to the under surface of the plate 8 and depends through a slot D of the sector into the groove 2 of the table. The stud 10 is provided with an antifriction-roller E, which rotates in the groove as it is carried therein with the rotation of the sector. It will be observed that as the stud 10 moves in the groove 2 the camming action of the curved portions of the slot acts to turn the plate on its axis, thereby partially rotating the said plate with each revolution of the sector. At a point diametrically opposite the said stud 10 is a second depending stud F, which is designed to ride in the slot 4 to engage the flange 5 and the camming edge of the lug A, heretofore described.

The segmental portion of the plate 8 is provided with teeth G, and the said teeth mesh with the pinion H, rotatable on the sector. The pinion is designed to carry a mold or any other device which may be used in conjunction with the apparatus heretofore described.

It will be observed in operation when the sector is moved in the direction of the arrow X in Figs. 2 and 3 the plate 8 on the sector will be moved in the direction of the arrow Y, indicated on said plate. When the parts are brought to the position shown in Fig. 3, the direction of rotation of the plate is reversed, owing to the stud 10 having moved in a circle and through the curved portion 3 of the groove.

Having fully described the invention, what I claim as new, and desire to secure by Letters Patent, is—

1. In a mechanical movement, a table having a cam-groove, a sector pivoted centrally of the table adapted to rotate thereover, a plate pivoted on the sector, a stud projecting through the sector, into the groove of the table, there being teeth formed on the curved edge of the plate and a pinion rotated by the plate.

2. In a mechanical movement, a table having a cam-groove, a sector pivoted centrally of the table adapted to rotate thereover, a plate pivoted on the sector and having a stud projecting through the sector into the groove of the table, a second stud depending from the plate, a flange carried by the table to engage the second-named stud, there being teeth formed on the edge of the plate and a pinion rotated by the movement of the said plate.

3. In a mechanical movement, a table having a cam-groove therein, the table having a groove and a flange on the outer edge of the groove, a sector adapted to rotate thereon, a plate pivoted on the sector, depending studs on the plate, one of which is adapted to ride in the camming-groove, there being teeth on the edge of the plate and a pinion meshing therewith.

4. In a mechanical movement, a table having a cam-groove approximately circular and having an inwardly-turned portion and an approximately straight portion at diametrically opposite points, said table having a cam-groove opposite the approximately straight portion of the first-named groove, a sector pivoted centrally of the table, a plate pivoted on the sector, depending studs on the plate adapted to ride in the two grooves of the table, there being teeth on the edge of the plate and a pinion mounted on the sector and adapted to engage the teeth of the plate.

5. In a mechanical movement, a table having a camming-groove approximately circular and having an inwardly-turned portion and an approximately straight portion at diametrically opposite points, said table having a camming-groove opposite the approximately straight portion of the first-named groove, a sector pivoted centrally of the table, a plate pivoted on the sector, depending studs on the plate adapted to ride in the two grooves of the table, there being teeth on the edge of the plate and a pinion mounted on the sector and adapted to engage the teeth of the plate and antifriction-rollers on the studs.

In testimony whereof I affix my signature in presence of two witnesses.

McCLELLAND MYERS.

Witnesses:
D. B. REPLOGLE,
G. E. SHAY.